Aug. 5, 1947.  P. C. LITTLE ET AL  2,425,253
CHILD'S STROLLER
Filed Aug. 27, 1946
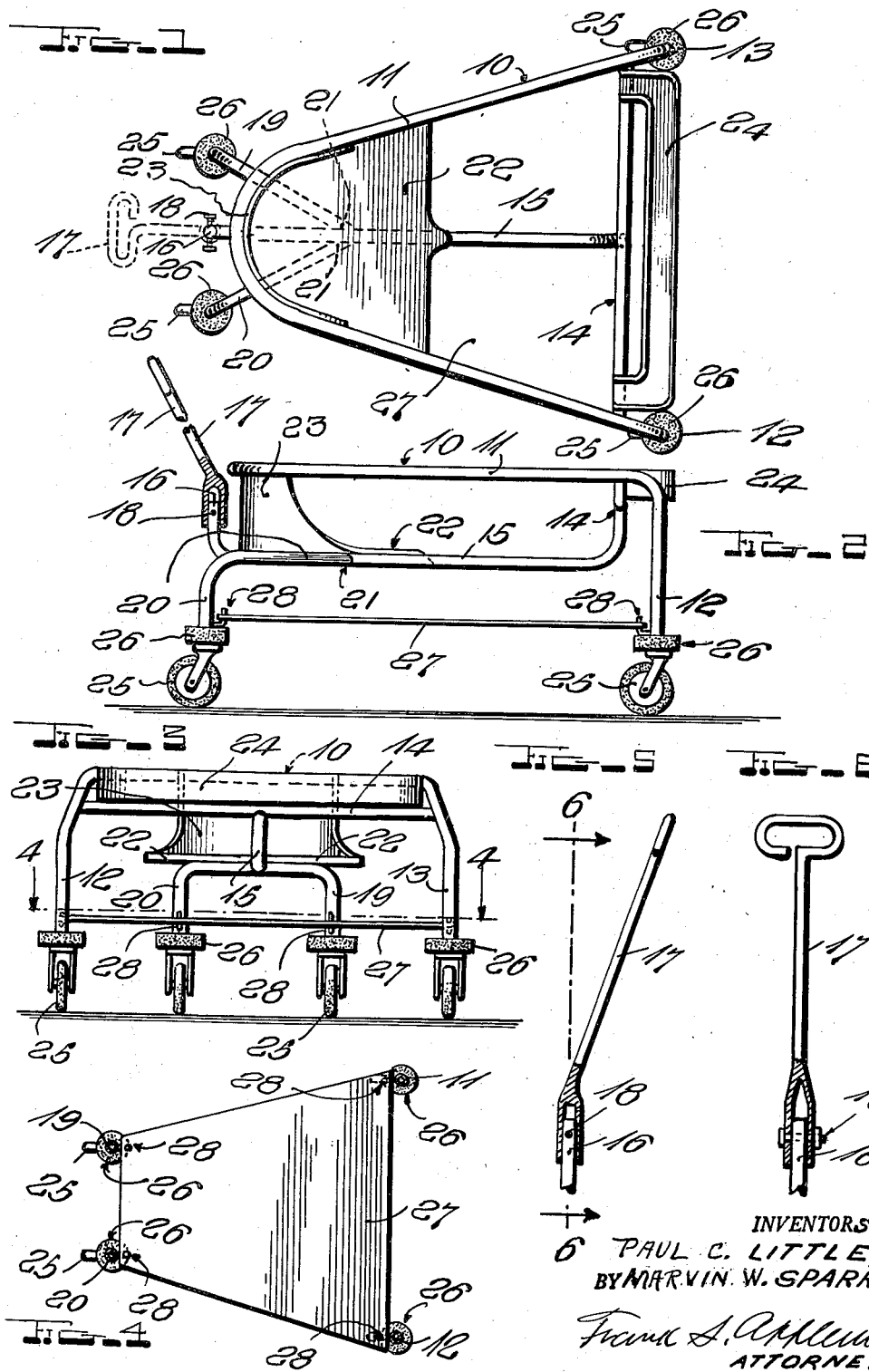
INVENTORS
PAUL C. LITTLE,
BY MARVIN W. SPARROW,
Frank S. Appleman
ATTORNEY Patented Aug. 5, 1947

2,425,253

UNITED STATES PATENT OFFICE 2,425,253

CHILD'S STROLLER

Paul C. Little, Hoboken, N. J., and Marvin W. Sparrow, Brooklyn, N. Y.

Application August 27, 1946, Serial No. 693,306

6 Claims. (Cl. 280—47)

This invention relates to vehicles and more particularly to children's vehicles of the type known as strollers.

Strollers of the type in use at the present time have disadvantages that our invention will obviate. Prior art devices of this type are difficult to maneuver and do not offer sufficient protection against marring furniture and walls when used inside the home.

It is an object of our invention to provide a stroller that will afford easy maneuverability.

It is another object of our invention to provide a stroller that will not cause damage to walls, furniture, or other articles when contacted by the vehicle.

Still another object of our invention is to provide a stroller that is extremely light in weight but possessed of great strength.

Another object of our invention is to provide a stroller which may easily be converted into a vehicle for teaching children to walk.

The above and other objects and advantages will become readily apparent when the following specification is read in conjunction with the accompanying drawings, in which Figure 1 is a plan view of a stroller embodying our invention;

Figure 2 is a side elevation of the stroller illustrated in Figure 1;

Figure 3 is a front view of the vehicle shown in Figure 1;

Figure 4 is a horizontal sectional view on the line 4—4 of Fig. 3; and

Figures 5 and 6 are detail views of the handle and its attachment.

Referring to the drawing, it is seen that the reference numeral 10 refers to a framework that may be composed of metal tubing welded together for lightness and strength. The frame 10 comprises an upper horizontal U-shaped member 11 having two depending legs 12 and 13, formed by bending the tubing of the U-shaped member so that they are in a plane perpendicular to the member 11. A reinforcing member 14 connects the two portions of the U-shaped member and provides added strength and rigidity. A longitudinal member 15 extends the full length of the vehicle and is bent upwardly at the front end thereof to join the reinforcing member 14 and is also bent upwardly at the back portion to provide a shank 16 fitting in a socket of a removable handle 17. The handle 17 is detachably fastened in the shank 16 by a toggle pin 18 or other suitable fastening means extending through the handle and shank 16.

Two rear legs 19 and 20 are formed of bent tubing welded to the longitudinal member 15 at 21. The rear legs 19 and 20 extend horizontally for a short distance rearwardly from 21 (Fig. 1) before curving to a vertical position as seen in Figures 2 and 3.

A metal seat having a saddle portion 22 and a vertical wall portion 23 forming sides and a curved back is made with rounded edges for protection of the user. The saddle portion 22 of the seat is welded to the members 15, 19 and 20, while the wall portion 23 is welded to the U-shaped member 11.

A stamped sheet-metal toy tray 24 is welded to the reinforcing member 14. The toy tray 24 like the metal seat is formed with rounded edges for protection of the user.

Secured to each of the legs 12, 13, 19 and 20 at the lower end thereof is a ball-bearing rubber-tired swivel caster wheel 25. Mounted upon each of the legs 12, 13, 19 and 20 immediately above the caster wheel 25 is a cylindrical bumper 26 which may be formed of a resilient material such as rubber. As can be seen from the drawings the bumpers 26 extend beyond any portion of the frame except the handle 17. This construction affords protection from marring or damaging furniture, walls, when the vehicle is used within a building.

A removable foot support 27 having an opening in each corner is supported by means of metal angle hooks 28, one each being mounted on legs 12, 13, 19 and 20.

From the foregoing description it is seen that we have provided a stroller that a child may use to enjoy freedom of movement in any direction without danger to the child or to surrounding objects. Great maneuverability is achieved by the use of four swivel wheels.

Although we have illustrated and described one embodiment of our invention, changes and modifications may be made without departing from the scope of the invention as set forth in the appended claims, and it is obvious that by reason of the fact that the parts are connected by welding and that mechanical fastenings are discarded, the structure is strong and durable as well as comparatively inexpensive.

We claim:

1. In a vehicle of the class described, a horizontal U-shaped member, each side of said U-shaped member having a downwardly extending vertical leg thereon, a lateral bracing member for said U-shaped member, a horizontal member one end of which is curved upwardly and connected to said lateral bracing member, the other end of said horizontal member being curved upwardly and formed as a shank for connection with a socket of a handle, a pair of legs mounted upon the back portion of said horizontal member, and a swivel wheel mounted upon each of said first mentioned legs and said last mentioned legs.

2. The vehicle set forth in claim 1 in which there is a separate bumper mounted above each wheel.

3. The vehicle set forth in claim 1 in which there is a separate bumper of a solid resilient material surrounding each of said first mentioned and last mentioned legs.

4. The vehicle set forth in claim 1 including a metal seat having a saddle portion mounted upon said horizontal member and a vertical wall portion mounted upon said U-shaped member.

5. The vehicle set forth in claim 1 including a means on each of said first mentioned legs and said last mentioned legs for removably supporting a foot rest.

6. The vehicle set forth in claim 1 including a handle having a toggle pin on its lower end, said handle removably mounted on the shank formed in said horizontal member.

PAUL C. LITTLE.
MARVIN W. SPARROW.

REFERENCES CITED

The following references are of record in the file of this patent:

UNITED STATES PATENTS

| Number | Name | Date |
| --- | --- | --- |
| 2,362,466 | Carter | Nov. 14, 1944 |
| 1,595,582 | Stedman | Aug. 10, 1926 |
| 1,307,058 | McGrath | June 17, 1919 |
| 2,316,100 | Nelson | Apr. 6, 1943 |